United States Patent Office 3,079,942
Patented Mar. 5, 1963

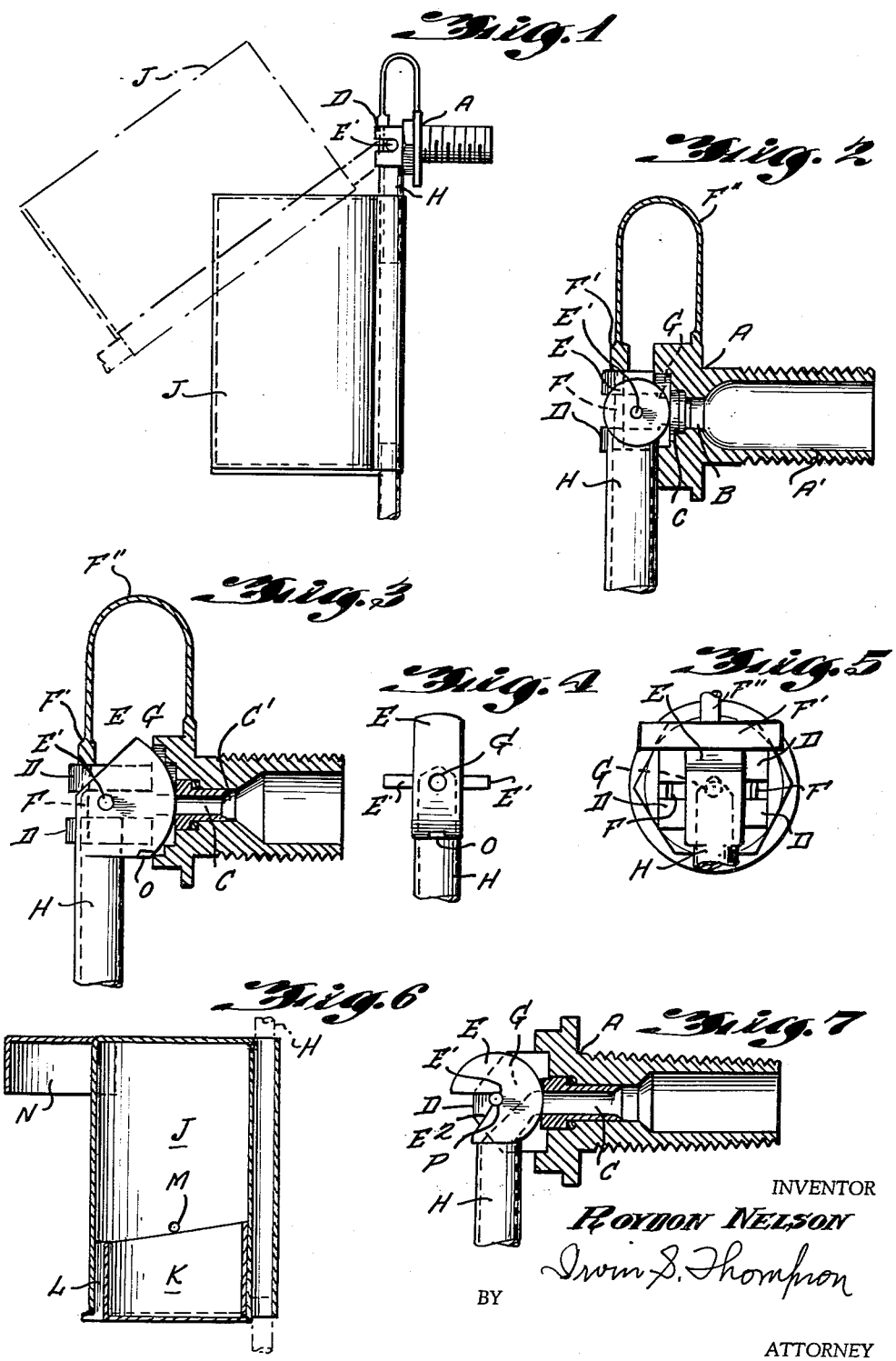

3,079,942
FLOAT VALVES
Roydon Nelson, Forresters Bldg., Albert St., Auckland, Auckland, New Zealand
Filed Feb. 10, 1959, Ser. No. 792,444
Claims priority, application New Zealand Feb. 20, 1958
2 Claims. (Cl. 137—315)

This invention relates to improvements in float valves of the type commonly referred to as the ball cocks for use in controlling the inflow of liquids into containers.

The valve is particularly designed for controlling the flow of water to lavatory flushing systems, and while hereinafter described for that purpose, it is to be understood that it is equally applicable to other uses where an automatic starting and stopping of flow is desired of liquid from a supply source which is to be passed to a container that is periodically discharged of its contents.

The features of the valve provide for cheapness and simplicity of construction, easy assembly, silent filling of the lavatory cistern, a full rate of flow until the moment of cut-off, a seating which requires no washer and does not leave the face of the valve during its operation and in which the greater the build up in pressure in the water supply source the more positively will the valve, when closed, check the inflow. Many valves or ball cocks have been designed to meet these conditions, but while some meet some of the requirements they fail in some of the other desirable aspects and are usually of complicated type where the valve usually leaves its seating during the inflow of the water to the cistern.

The invention covers broadly a float operated valve for controlling the flow of liquid from a supply source into a container comprising in combination a body portion having a flow-way therethrough and means at one end of that body portion for connecting it to the liquid supply source and to the container, a valve seat located in the flow-way at the other end of the body portion and bearings on this end of that body portion, a valve member circular in cross section rotatably mounted in the said bearings so that when the valve is revolved its face bears against and covers the outlet in the valve seat, a float connected to the valve and a port opening passing from the face of the valve through it and so positioned that only when the float is in its down or lowered position will this port opening register with the opening in the valve seat and the flow-way.

In fully describing the invention reference will be made to the accompanying drawings in which—

FIGURE 1 is a side elevation of a float valve unit.
FIGURE 2 is a part sectional side view of the valve mechanism according to one construction, and
FIGURE 3 is a similar view according to a further construction.
FIGURE 4 is an end view of the valve member.
FIGURE 5 is an end view of the mechanism and
FIGURE 6 is a sectional side view of a further construction of the float.
FIGURE 7 is a sectional side view of a further alternative construction of the valve mechanism.

The float operated valve comprises the two main sections, body or main portion and the valve member to be referred to respectively hereinafter as the "valve seat" or "valve seat portion" and the "valve" or "valve portion."

Still further, the float valve will for simplicity be described for controlling the flow of water or liquid from a supply source into a cistern as, for instance, a lavatory cistern.

In describing the valve according to FIGURES 1 to 6 of the drawings the valve seat portion A comprises a tubular member $A^1$ having the connection means as by being screw-threaded from one end for attachment to the liquid supply source as, for instance, a pipe end projecting into a cistern or container. The portion A has a flow-way B therethrough. The other or outer end of this seat portion A forms a housing for the actual valve seat which is in the form of a small sealing disc or hollow piston or sleeve C such that the sleeve may move longitudinally in the flow-way B and is retained therein by an O ring or the like seal between an enlarged head on the sleeve and a recess in the flow-way. This sleeve preferably projects slightly beyond the surrounding end of the flow-way B which is more clearly illustrated in FIGURE 7 of the drawings. The mounting of this seat is such that, while it allows water to flow through its central orifice, it tends to be forced by the liquid pressure from the supply source longitudinally outwards of the end of the tubular member $A^1$, and this action causes it to bear constantly against the valve hereinafter to be described so that the valve seat sleeve C will bear hard against the valve and any wear will be compensated for by the further outward movement of the said sleeve C. The greater the pressure in the flow-way the greater will be the thrust of the sleeve head against the valve.

On the valve seat end of the portion A are bearings D each adapted to receive and hold a pin $E^1$ on the valve portion.

The valve portion E may be one of several forms, for instance, spherical as a ball, a circular disc with flat or convex face as by being curved transversely or semi-spherical as half a ball or disc. In one form, illustrated in detail in FIG. 2, it is a circular disc with an axial pin $E^1$ passing out from each side and with its periphery made of convex shape.

The pins $E^1$ are designed to locate in the bearings D on the valve seat portion and be held or locked therein by means such as pins or staples F such that the valve disc may be revolved but with a portion of its face always riding over and on the valve seat opening to normally close that opening and prevent liquid from flowing out therefrom.

In use the staples F press against the pins $E^1$ to hold the valve against the seat with a compression of the O ring but in the drawings, for the sake of clarity, there is a space shown between the staples and the pins. The amount of compression of the O ring is equivalent to that of a high water pressure so that even with low water pressures in the pipe the frictional resistance between the valve and the seating will be sufficient to maintain a seal between the valve and the valve seat.

In the face of the disc is an opening of a port G which extends inwardly and then preferably is restricted as by turning at right angles and opens into a tube H (hereinafter to be referred to as the filler tube) which is attached to the disc E.

The port is so arranged that, only when the filler tube H extends approximately vertically downwards, does the port G in the disc face register with the valve seat opening so that, when the tube is raised even a short distance from the lowered position, the port is turned out of registration with the valve seat opening and that opening is closed by a solid portion of the disc face and the flow of liquid through the valve is sealed off. The tube H is preferably made long enough so that it nearly reaches the bottom of the cistern.

A float J is conventionally attached by an arm to the disc to operate the valve, but in its preferred and illustrated form the float J is attached to or made part of the filler tube H which acts as the arm and is of such a construction that it does not, as is usual with most floats for lavatory cisterns, rise gradually and correspondingly with the rise of water in the cistern to gradually cut off the water inflow but will remain down until the cistern has been filled at full pressure to the desired level, upon which it will swing up a distance sufficient to seal off the flow through the valve portion with a semi-snappy action.

In one preferred form the float J comprises a hollow cylindrical member which is attached to one side of the flow pipe H. The lower or outer end of the cylinder is weighted so that it normally tends to swing the free end of the filler tube to its vertically down position. The weight and shape of the cylinder is so calculated that it does not move from its vertical position until the water level in the cistern has reached its full position, upon which the floating action of the cylinder overcomes its weight and the cylinder with the attached filler tube swings through an arc so that the valve disc E is turned to a position where a solid portion thereof covers the outlet at the valve seat.

The float J may suitably be made in the form illustrated in FIG. 6 and in this case the cylinder is closed at its top end but open at its bottom which latter end is adapted to receive a sleeve cup K of calculated capacity having a water inlet groove L up its wall. An air hole M is located in the cylinder wall just above the top of the sleeve cup K when the latter is inserted in the cylinder. Water is thus free to flow into and fill the sleeve cup and this water acts as the weight to bring the float to its down position after each emptying of the container in which it is mounted in which position it remains until the water level in the container reaches its desired level upon which the air imprisoned in the cylinder acts to swing up the valve and close the inflow of water to the cylinder.

As a safety factor and to make doubly sure of the lifting of the float at the desired calculated time an inverted cup-like member N may be attached to the top of the cylinder as is shown in FIG. 6 and air caught in this cup when the water level rises past its bottom edge will give an added lift to the cylinder right at the end of the inflow to the container.

As one alternative to the cylinder, but not illustrated in the drawings, the float may comprise an open ended cup or bell which is attached to the filler tube H with its mouth downwards, and it is positioned at varying positions on that filler tube such that as the water rises it imprisons air in the bell which is gradually compressed until, when the desired level of water is reached in the cistern, the imprisoned air swings the filler tube up to close the valve.

The valve in its various parts may be made of any suitable material, but it lends itself to moulding from plastics and in particular, nylon, which latter is unaffected by water impurities. If desired, the different parts may be made of different materials. The use of plastic and in particular nylon, makes for novel features of manufacture, for instance the staple head $F^1$ may be joined to the main section A by means of a flexible strap $F^{11}$ so that it does not become lost therefrom.

In FIG. 3 of the drawings there is illustrated one of the alternative forms of the valve E mentioned earlier. In this instance it is a segment of a circle only. In all cases it is necessary that the float be checked from going beyond the vertically down position when it lowers and in the present instance this is prevented by a stop O contacting the face of the main seat portion A.

In this FIG. 3 there is also illustrated an alternative form of constructing the sleeve C for in this instance its inner end is tapered off as at $C^1$ to form a fin and may also be complementary to the restriction illustrated in this figure in the flow-way B.

In FIG. 7 there is illustrated a variation in construction of the unit still embodying the features of the valve partially rotating on the valve seat but in this instance the pin $E^1$ extends transversely between the bearing members D on the body port A. The valve member E in this instance is solid for about three quarters of its cross sectional area leaving an open segmental portion $E^2$ which ends at its bottom in a slightly enlarged recess P at the centre of the valve member and of slightly greater size than the diameter of the pin $E^1$ to be accommodated therein. The segment is cut out close to the filler tube H but on the opposite side to the port opening G. In this figure of the drawings the valve is shown at its open position but by swinging the valve past its fully closed position to one where the filler tube projects up towards the vertical the valve may be slid off the pin $E^1$. This alternative construction provides a means for easy assembly and disassembly of the unit for in this case no staple F is required to hold the valve face up against the slightly projecting outer face of the sleeve C.

The filler tube H used in this unit for convenience is made in three portions to enable easy assembly of the unit which portions fit into each other and comprise an upper portion of metal or moulded in one with the valve portion E and leading from the outlet end of the port opening G, a central portion attached to the side of or formed in one with the float J, and an outer portion which is fitted as an extension to the bottom of portion on float J. This latter is adjusted in length so that preferably the inflow of water leaves the filler tube close to the bottom of the container.

Having now described my invention, what I claim is:

1. A container, a liquid supply source for said container, and a float operated valve responsive to variations of liquid level in the container to thereby control the flow of liquid from said supply source into said container comprising in combination a body portion having a flowway therethrough and means at one end of said body portion for connecting it to a liquid supply source and the container, said body portion having a valve seat provided with an outlet located in the flowway and a bearing surface at one end thereof, a valve member rotatably mounted in mounting means on said body portion so that when the valve member is revolved, its surface bears against and covers the outlet in the bearing surface of the valve seat, means to bias said valve seat against said valve member, a float connected to the valve member, means to mount said float to said valve member, a port opening passing from the surface of the valve member through it and so positioned that only when said float is in its lowered position will said port opening register with the outlet in the bearing surface of the valve seat and the flowway, and means allowing easy disassembly of said valve member from said mounting means including a pin extending centrally out from each side of the valve member so as to be located in said mounting means and be held captive therein by removable locking means which serve to hold the valve member against the valve seat.

2. A container, a liquid supply source for said container, and a float operated valve responsive to variations of liquid level in the container to thereby control the flow of liquid from said supply source into said container comprising in combination a body portion having a flowway therethrough and means at one end of said body portion for connecting it to a liquid supply source and the container, said body portion having a valve seat provided with an outlet located in the flowway and a bearing surface at one end thereof, a valve member rotatably mounted in mounting means on said body portion so that when the valve member is revolved, its surface bears against and covers the outlet in the bearing surface of the valve seat, means to bias said valve seat against said valve member, a float connected to the valve member, means to mount said float to said valve member, a port opening passing from the surface of the valve member through it and so positioned that only when said float is in its lowered position will said port opening register with the outlet in the bearing surface of the valve seat and the flowway, and means allowing easy disassembly of said valve member from said mounting means including a segment cut out of the valve member leaving an enlarged cavity at the center thereof adapted to locate a pin extending transversely between said mounting means, the cavity being so located that only when the valve member is rotated about the pin to a position considerably beyond any of its operative positions can the valve member be disassembled from the body portion.

References Cited in the file of this patent

UNITED STATES PATENTS

| | | |
|---|---|---|
| 120,668 | Radston | Nov. 7, 1871 |
| 1,007,009 | Rothchild et al. | Oct. 24, 1911 |
| 1,520,914 | Separing | Dec. 30, 1924 |
| 2,005,232 | Hardy et al. | Sept. 22, 1936 |
| 2,136,707 | Owens | Nov. 15, 1938 |
| 2,238,158 | Cross | Apr. 15, 1941 |

FOREIGN PATENTS

| | | |
|---|---|---|
| 373,476 | Great Britain | May 26, 1932 |
| 704,913 | Great Britain | Mar. 3, 1954 |